US009626643B2

(12) United States Patent
Heitner et al.

(10) Patent No.: US 9,626,643 B2
(45) Date of Patent: Apr. 18, 2017

(54) OBJECT-BASED INFORMATION COLLECTION IN OPERATION PERFORMANCE

(75) Inventors: Ami Heitner, Kfar-Sava (IL); Irena Kull, Yehud (IL); Amit Yaniv, Zur Moshe (IL); Pavel Sosin, Herzllya (IL); Sergio Rozenszajn, Rehovot (IL); David Boaz, Netanya (IL)

(73) Assignee: SAP SE, Walldorf (DE)

(*) Notice: Subject to any disclaimer, the term of this patent is extended or adjusted under 35 U.S.C. 154(b) by 2545 days.

(21) Appl. No.: 11/323,666

(22) Filed: Dec. 30, 2005

(65) Prior Publication Data

US 2007/0168385 A1    Jul. 19, 2007

(51) Int. Cl.
*G06Q 10/08* (2012.01)
(52) U.S. Cl.
CPC ................... *G06Q 10/087* (2013.01)
(58) Field of Classification Search
CPC ...................... G06Q 10/063; G06Q 10/087
See application file for complete search history.

(56) References Cited

U.S. PATENT DOCUMENTS

| | | | | |
|---|---|---|---|---|
| 7,379,779 | B2* | 5/2008 | Ekberg | 700/95 |
| 2003/0110156 | A1* | 6/2003 | Iwamoto et al. | 707/1 |
| 2004/0172341 | A1* | 9/2004 | Aoyama et al. | 705/26 |
| 2006/0218058 | A1* | 9/2006 | Wojcik et al. | 705/28 |
| 2009/0287321 | A1* | 11/2009 | Lucas et al. | 700/79 |

OTHER PUBLICATIONS

Scott Stephens, Supply Chain Operations reference Model Version 5.0: A New Tool to Improve Supply Chain Efficiency and Achieve Best Practice, 2001, Kluwer Academic Publishers, vol. 3:4, 472.*
Scott Stephens, Supply Chain Operations reference Model Version 5.0: A New Tool to Improve Supply Chain Efficiency and Achieve Best Practice, 2001, Information Systems Frontiers, Kluwer Academic Publishers, 3:4, 471-476.*
Scott Stephens, "Supply Chain Operations Reference Model Version 5.0: A New Tool to Improve Supply Chain Efficiency and Achieve Best Practice", 2001, Information Systems Frontiers 3:4, 471-476.*
Scott Stephens, "Supply Chain Operations reference Model Version 5.0: A New Tool to Improve Supply Chain Efficiency and Achieve Best Practice", 2001, Kluwer Academic Publishers, 471-476.*

(Continued)

*Primary Examiner* — Andre Boyce
(74) *Attorney, Agent, or Firm* — Fish & Richardson P.C.

(57) ABSTRACT

A method to be performed in a computer system in association with initiating a physical operation includes receiving a request object that corresponds to a request to initiate a physical operation. The method includes generating, using the request object, an information collection object configured to represent performance of the physical operation. The method includes obtaining data generated in the performance of the physical operation and recording the data in the information collection object. A computer system includes a request management module configured to generate the request object upon receiving a request to initiate a physical operation, and an information collection module configured to generate the information collection object using the request object.

1 Claim, 9 Drawing Sheets

(56) References Cited

OTHER PUBLICATIONS

'Adonix Geode GX' [online]. Adonix, 2006, [retrieved on Mar. 9, 2006]. Retrieved from the Internet: <URL:www.adonix.us/Adonix_Geode_GX.189.0.html >.
'Advanta Software' [online]. Advanta Software, [retrieved on Mar. 9, 2006]. Retrieved from the Internet: <URL:www.advantasoftware.com.au/home.asp>.
'G.O.L.D. Stock: Integrating your logistics network in your supply chain' [online]. Aldata, [retrieved on Mar. 31, 2006]. Retrieved from the Internet: <URL: www.aldata-solution.fr/eng/products/brochure_stock_2005_en.pdf >.
'G.O.L.D. Pick: Picking zone optimisation' [online]. Aldata, [retrieved on Mar. 31, 2006]. Retrieved from the Internet: <URL: www.aldata-solution.fr/eng/new_and_events/G.O.L.D.%20Pick%20EN.pdf >.
'G.O.L.D. Business Solution: Voice in the warehouse' [online]. Aldata, [retrieved on Mar. 31, 2006]. Retrieved from the Internet: <URL www.aldata-solution.fr/eng/new_and_events/ G.O.L.D.%20 Vocal%20EN.pdf>.
'G.O.L.D Billing: Logistics services invoicing' [online]. Aldata, [retrieved on Mar. 31, 2006]. Retrieved from the Internet: <URL www.aldata- solution.fr/eng/new_and_events /G.O.L.D.%20Billing%20EN.pdf>.
'Enterprise-wide distribution software and solutions' [online]. Apprise Software, [retrieved on Mar. 9, 2006]. Retrieved from the Internet: <URL www.apprise.com>.
'Aquitec Solutions' [online]. Aquitec, 2004 [retrieved on Mar. 9, 2006]. Retrieved from the Internet: <URL www.aquitecintl.com/solutions/ewms.asp>.
CatalystCommand Warehouse Management' [online]. Catalyst International, [retrieved on Mar. 9, 2006]. Retrieved from the Internet: <URL www.catalystinternational.com/content/solution_center/execution/warehousing/management.asp>.
'ClearOrbit' [online]. Clear Orbit, 2006 [retrieved on Mar. 9, 2006]. Retrieved from the Internet: <URL www.clearorbit.com/index.php?sess_id=ab8ee7ae2675c92981a0a13b398c9100>.
'SattStore WMS: Total control and optimization of your automated or manual DC' [online]. Consafe Logistics, 2006 [retrieved on Mar. 9, 2006]. Retrieved from the Internet: <URL www.consafelogistics.com/Warehouse%20Management%20Systems/Products/SattStoreWMS.aspx >.
'Astro WMS: Efficient real-time warehouse management' [online]. Consafe Logistics, 2006.[retrieved on Mar. 9, 2006]. Retrieved from the Internet: URLwww.consafelogistics.com/Warehouse%20Management %20Systems/Products/AstroWMS.aspx >.
'Effect Warehouse: Easily implemented, cost-effective and robust' [online]. Consafe Logistics, 2006 [retrieved on Mar. 9, 2006]. Retrieved from the Internet: <URL www.consafelogistics.com/Warehouse%20Management%20Systems/Products/Effect_Warehouse.aspx >.
'CorePartners' [online]. CorePartners, 2006 [retrieved on Mar. 9, 2006]. Retrieved from the Internet: <URL: www.coreims.com >.
'Daifuku Warehouse Rx WMS software' [online]. Daifuku Company, 1998-2005 [retrieved on Sep. 3, 2006]. Retrieved from the Internet: <URL www.daifukuglobal.com/daifuku/ global/products/f_wmssoftware 1.asp >.
'Supply chain execution' [online]. Epicor , [retrieved on Mar. 9, 2006]. Retrieved from the Internet: <URLwww.epicor.com/www/products/enterprise/scm/warehousing.htm >.
'Warehouse management—SCE' [online]. Fascor, 2005[retrieved on Mar. 9, 2006]. Retrieved from the Internet: <URL www.fascor.com/faswms05.htm >.
'Foxfire Technologies' [online]. Foxfire Technologies, [retrieved on Mar. 9, 2006]. Retrieved from the Internet: <URL: www.foxfiretechnologies.com>.
'FKI Logistix White Systems launches SpectrumPlus Warehouse Control System' [online]. FKI Logistix, 2000-2005 [retrieved on Mar. 9, 2006]. Retrieved from the Internet: <URL:www.fkilogistex.com/ media-center/press-releases/default.aspx?pid=181-2&k=spectrum%20plus&m=0&y=0 >.
SmartEnterprise 2: An integrated software suite for comprehensive 3PL management [online]. Headwater Technology Solutions, [retrieved on Mar. 9, 2006]. Retrieved from the Internet: <URL: www. Headwaterinc.com/download/HW_SmartEnterprise.pdf>.
'HighJump Software: Your partner for long-term competitive advantage' [online]. HighJump Software, 2000-2006 [retrieved on Mar. 9, 2006]. Retrieved from the Internet: <URL: www.highjumpsoftware.com/SupplyChainAdvantage/Difference >.
'ICS Logimax' [online]. ICS, [retrieved on Mar. 9, 2006]. Retrieved from the Internet: <URL: www.e-logimax.com/downloads/lmx_overvew.pff >.
'Infor' [online]. Infor, 2006[retrieved on Mar. 9, 2006]. Retrieved from the Internet: <URL: www.infor.com >.
'Intek: Warehouse librarian' [online]. INTEK Integration Technologies, 2004 [retrieved on Mar. 9, 2006]. Retrieved from the Internet: <URL: www.intek.com>.
'Irista Warehouse' [online]. Irista, 2006 [retrieved on Mar. 9, 2006]. Retrieved from the Internet: <URL: www.irista.com>.
'IRMS Warehouse management system' [online]. Integrated Warehouing Solutions (IWS) , [retrieved on Mar. 9, 2006]. Retrieved from the Internet: <URL: www.irmswms.com/>.
'IntelliTrack Warehouse management system' [online]. IntelliTrack , 2005 [retrieved on Mar. 9, 2006]. Retrieved from the Internet: <URL: www.intellitrack.net/warehouse_management _system_wms.asp>.
'IntelliTrack slap and ship' [online]. IntelliTrack, [retrieved on Mar. 9, 2006]. Retrieved from the Internet: <URL: www.intellitrack.net/upgrades_downloads.asp ftp://ftp.intellitrack.net/DataSheets/Slap&Ship.pdf>.
'Logility Voyager WarehousePRO' [online]. Logility, 2006 [retrieved on Mar. 9, 2006]. Retrieved from the Internet: <URL: www.logility.com/solutions/warehousemgt.html >.
Manhattan associates: A complete set of supply chain solutions [online]. Manhattan Associates, [retrieved on Mar. 9, 2006]. Retrieved from the Internet: <URL: www.manh.com >.
'Rf navigator EMMS' [online]. Majure Data, 2005 [retrieved on Mar. 9, 2006]. Retrieved from the Internet: <URL: www.majuredate.com>.
'Mincron: Distribution and Warehousing Software' [online]. Mincron, [retrieved on Mar. 9, 2006]. Retrieved from the Internet: <URL: www.mincron.com/index_1024.htm >.
'Microlistics: ISIS Enterprise' [online]. Microlistics, 2002 [retrieved on Mar. 9, 2006]. Retrieved from the Internet: <URL: www.microlistics.com/micro/products/isisenterprise.jsp >.
'Microlistics: ISIS Express' [online]. Microlistics, 2002 [retrieved on Mar. 9, 2006]. Retrieved from the Internet: <URL: www.microlistics.com/micro/products/isisexpress.jsp>.
'Microlistics: ISIS 3PL' [online]. Microlistics, 2002 [retrieved on Mar. 9, 2006]. Retrieved from the Internet: <URL: www.microlistics.com/micro/products/isisenterprisejsp >.
'Navis' [online]. Navis, [retrieved on Mar. 9, 2006]. Retrieved from the Internet: <URL: www.navis.com/home.jsp>.
'Open Business Solutions: Calidus-e' [online]. Open Business Solutions, 2004 [retrieved on Mar. 9, 2006]. Retrieved from the Internet: <URL: www.openbusinesssolutions.co.uk/index.html >.
'Oracle Corporation' [online]. Oracle, 2006 [retrieved on Mar. 9, 2006]. Retrieved from the Internet: <URL: www.oracle.com/index.html>.
'Provia: FourSite OMS' [online]. Provia, 2006 [retrieved on Mar. 9, 2006]. Retrieved from the Internet: <URL: www.provia.com/ProductSolutions/FourSiteOMS/default.htm?ave=WM>.
'Provia: ViaWare WMS'[online]. Provia, 2006 [retrieved on Mar. 9, 2006]. Retrieved from the Internet: <URL: www.provia.com/ProductsSolutions/ViaWareWMS/default.htm?ave=WM>.
'PSI Logistics: PSIwms' [online]. PSI Logistics, 2005 [retrieved on Mar. 9, 2006]. Retrieved from the Internet: <URL: www.psilogistics.com/warehouse-management/en >.
'QSSI: PowerHouse/WMS' [online]. QSSI, 1985-2005[retrieved on Mar. 9, 2006]. Retrieved from the Internet: <URL: www.qssi-wms.com/>.

(56) References Cited

OTHER PUBLICATIONS

'Radcliffe: ROC RFID' [online]. Radcliffe, 2005[retrieved on Mar. 9, 2006]. Retrieved from the Internet: <URL: www.radcliffeinc.com/cws/index.jsp?name=NVs9CB8B6w>.
Radio Beacon—Warehouse Management Software [online]. Radio Beacon, 2005 [retrieved on Mar. 10, 2006]. Retrieved from the Internet: <URL: www.radiobeacon.com/Solution/RadioBeaconWMS.aspx >.
'RedPrairie: Warehouse' [online]. RedPrairie, [retrieved on Mar. 10, 2006]. Retrieved from the Internet: <URL: www.redprairie.com/Warehouse%20Management/default.aspx >.
Retalix: Triceps Warehouse Management [online]. Retalix, 2006[retrieved on Mar. 10, 2006]. Retrieved from the Internet: <URL: www.retalix.com/index.cfm?pageid=546 >.
'Retalix: MDS Yard & Dock Control' [online]. Retalix, 2006[retrieved on Mar. 10, 2006]. Retrieved from the Internet: <URL: www.retalix.com/index.cfm?pageid=550 >.
'Robocom: Warehouse Management Solutions' [online]. Robocom, 2004[retrieved on Mar. 10, 2006]. Retrieved from the Internet: <URL: www.robocom.com/ >.
'RT Systems: RT Locator' [online]. RT Systems, 2005[retrieved on Mar. 10, 2006]. Retrieved from the Internet: <URL: www.t-systems.com/>.
'Connecting a Fully Automated Warehouse' [online]. SAP, [retrieved on Mar. 6, 2006]. Retrieved from the Internet: <URL: //help.sap.com/saphelp_nw04/helpdata/en/52/16ab2e543311d1891c0000e8322f96/cont>.
'Connecting a Semi-Automated Warehouse' [online]. SAP, [retrieved on Mar. 6, 2006]. Retrieved from the Internet: <URL://help.sap.com/saphelp_nw04/helpdata/en/52/16ab21543311d1891c0000e8322f96/cont>.
Scenarios for connecting external systems [online]. SAP, [retrieved on Mar. 6, 2006]. Retrieved from the Internet: <URL: http://help.sap.com/saphelp_nw04/helpdata/en/52/16aafa543311d1891c0000e8332f96/conte>.
'SAP: mySAP Supply Chain Management' [online]. SAP, [retrieved on Mar. 10, 2006]. Retrieved from the Internet: <URL: www.sap.com/usa/solutions/business-suite/scm/pdf/BWP_WM_LES.pdf>.
'Savant Software: Shipping Manifest System' [online]. Savant Software, 2006[retrieved on Mar. 10, 2006]. Retrieved from the Internet: <URL: www.savantwms.com/main.asp?sec=solutions>.
'Scenic Technology: On demand warehouse management software' [online]. Scenic Technology, [retrieved on Mar. 10, 2006]. Retrieved from the Internet: <URL: www.scenictechnology.com/ >.
'Siemens Logistics & Assembly: Dematic' [online]. Seimens Logistics & Assembly, 2006 [retrieved on Mar. 10, 2006]. Retrieved from the Internet: <URL: www.logistics-assembly.siemens.com/docs/stc_corp_home_fl.asp?id=23385&sp=E&m1=23384&m2=23385&m3=&domid=1029&zfz=2004930-33982-47 >.
'SSA Global: SSA ERP' [online]. SSA Global, [retrieved on Mar. 10, 2006]. Retrieved from the Internet: <URL: www.ssaglobal.com/documents/ssa_erp_lx_release.doc >.
'Sterling Commerce: Network Warehouse Management System' [online]. Sterling Commerce, 2006[retrieved on Mar. 10, 2006]. Retrieved from the Internet: <URL: www.sterlingcommerce.com/About/ News/WarehouseManagementReport.htm >.
'Swisslog: Warehouse manager' [online]. Swisslog, 2004[retrieved on Mar. 10, 2006]. Retrieved from the Internet: <URL: www.swisslog.com/wds-index/wds-sw/wds-sw-wm.htm >.
'Swisslog: Automation Manager' [online]. Swisslog, 2004[retrieved on Mar. 10, 2006]. Retrieved from the Internet: <URL: www, http://www.swisslog.com/wds-index/wds-sw/wds-sw-am.htm >.
'Tecsys: Warehouse Management Software' [online]. Tecsys, [retrieved on Mar. 10, 2006]. Retrieved from the Internet: <URL: www.tecsys.com/products/wms.shtml >.
'Tecsys: Pointforce Distribution Management System' [online]. Tecsys, [retrieved on Mar. 10, 2006]. Retrieved from the Internet: <URL: www.tecsys.com/products/dms/capabilities.shtml >.
'Wolin Design Group: da Vinci Supply Chain Business Suite/ Icon WMS' [online]. Wolin Design Group, 2004 [retrieved on Mar. 10, 2006]. Retrieved from the Internet: <URL: www.wdgcorp.com/ >.
"E71-MTO Order Processing", *mySAP All-in-One*, Release V3.46C, Jul. 2003.

\* cited by examiner

OBJECT-BASED INFORMATION COLLECTION IN OPERATION PERFORMANCE

TECHNICAL FIELD

The description relates to collecting information using an object in performing a physical operation.

BACKGROUND

There exists systems for computerized automation of operations and processes in industrial or other commercial enterprises. Examples of such existing systems are those available from SAP AG in Walldorf (Baden) Germany. Some of the existing systems are intended for use with the logistic procedures and operations that are common in manufacturing processes and they are therefore typically used in production plants. Other systems, or components of systems, are intended for use in the logistic management of products that have already been manufactured. They are therefore typically used in warehouses, distribution centers and other facilities where goods may be inspected, repacked and moved to particular storage locations while awaiting shipment.

The distribution of responsibilities and functionality between these two categories of systems is based on the way that these industries have emerged and developed historically. That is, over decades in the past, production plants and similar facilities have carried out their operations according to well-established routines that involve the basic steps of making the product. Improvements in technology have changed the way certain tasks are performed, but the general logistic view of how the core constituents of the manufacturing process is carried out has not changed as significantly. Similarly, warehouses have traditionally been viewed as facilities mainly for logistic management of goods without significant modification and, thus, essentially non-manufacturing in nature.

This view is reflected in the existing systems for controlling manufacturing processes. The computer model they use for the different components of the process are typically specialized and heavily flavored by the traditional manufacturing view. Systems for warehouse management, in contrast, have other computer models that are targeted toward managing the logistics of storing and eventually delivering goods. A disadvantage of existing systems, then, is that they are designed and configured for only their type of process and lack flexibility in adapting to new demands in the industry and the marketplace that challenge the traditional views.

Existing systems often work with delivery documents to initiate physical operations. One disadvantage with this approach is that it may not reflect how the individual steps of a complex operation fit together. Also, the reporting of the performed operation may be at the same level as the planning, which can be a disadvantage if the execution does not exactly match the planned operation, because the information about the initially planned operation may be entirely or partly lost. Also, the approaches for confirming the physical operation, updating inventory and determining costs may lack sufficient flexibility to apply to a broad range of implementations.

SUMMARY

The invention relates to object-based information collection in performing a physical operation.

In a first general aspect, a method to be performed in a computer system in association with initiating a physical operation includes receiving a request object that corresponds to a request to initiate a physical operation. The method includes generating, using the request object, an information collection object configured to represent performance of the physical operation. The method includes obtaining data generated in the performance of the physical operation and recording the data in the information collection object.

Implementations may include any or all of the following features. The method may further include generating, in response to the request object, an order object that describes the physical operation. The information collection object may be generated upon the order object being released. During the performance of the physical operation a change may be made relative to the description in the order object, and the method may further include recording the change in the information collection object and not in the order object. The method may further include updating the order object after the performance of the physical operation to indicate fulfillment of the physical operation. The order object may be updated using the information collection object. The method may be performed in a process of managing a product after manufacture and there may be included, in each of the order object and the information collection object, nodes corresponding to at least a making type operation and a packing type operation. The method may be performed in a process of manufacturing a product, and there may be included, in each of the order object and the information collection object, nodes corresponding to at least a making type operation and a moving type operation. At least one segment containing execution information may be included in the request object, and the segment may be used in generating the information collection object. An order object describing the physical operation may be generated using the segment, and the information collection object may be generated upon the order object being released. The information collection object may include (a) at least one operation node corresponding to the physical operation, (b) associated with the operation node at least one activity node representing an activity to be performed in the physical operation, and (c) associated with the activity node at least one step node representing a step to be performed in the physical operation. The information collection object may be used to initiate the physical operation. At least one task object may be generated using the information collection object, the task object corresponding to a predefined task that is a portion of the physical operation. A confirmation object may be generated after the performance of the physical operation using the information collection object, the confirmation object confirming the physical operation. Costs associated with the physical operation may be collected after the performance thereof, the costs being collected using the information collection object. The method may be performed in a process of manufacturing a product and may further include using the information collection object after the performance of the physical operation to track a product genealogy for the manufactured product.

In a second general aspect, a computer system includes a request management module configured to generate a request object upon receiving a request to initiate a physical operation. The computer system includes an information collection module configured to generate an information collection object using the request object. The information collection object is configured to represent performance of the physical operation. The computer system includes an initiation module configured to initiate the performance of the physical operation using the information collection object. The information collection module records in the information collection object data generated in the performance of the physical operation.

Implementations may include any or all of the following features. The computer system may further include an order management module configured to generate an order object in response to the request object. The order object describes the physical operation and the information collection object is generated upon the order object being released. The computer system may further include a confirmation module configured to generate a confirmation object after the performance of the physical operation. The confirmation object confirms the physical operation and is generated using the information collection object. The computer system may be configured for use in managing a product after manufacture, and each of the order object and the information collection object may include nodes corresponding to at least a making type operation and a packing type operation. The computer system may be configured for use in manufacturing a product, and each of the order object and the information collection object may include nodes corresponding to at least a making type operation and a moving type operation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
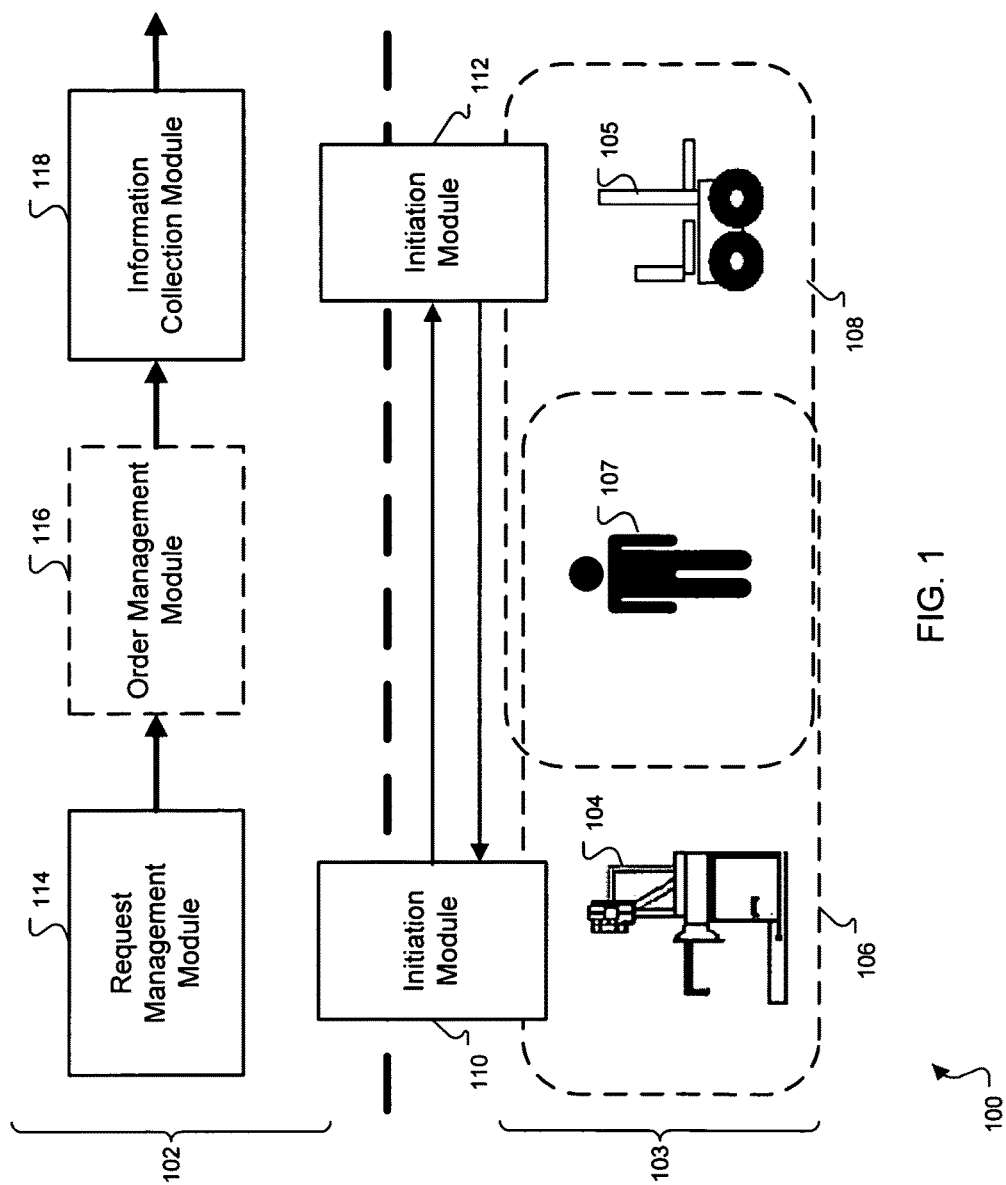
FIG. 1 is a block diagram of a facility that can perform manufacturing-type operations and warehousing-type operations.

FIG. 1 is an exemplary block diagram of a facility 100 that can perform manufacturing-type operations and warehousing-type operations. The facility 100 has a computer environment 102 that can plan, initiate and control physical operations in a physical environment 103. Particularly, the computer environment 102 uses an execution object to collect data generated in performing physical operation and can initiate the execution object based on releasing an order object.

The facility 100 includes one or more resources to be used in performing physical operations. The following are exemplary resources that may be used. The facility may contain a machine 104, such as an automated drill, or a forklift 105 that may be either robotic or manually operated. The facility may also include at least one employee 107, such as an operator or other personnel. Machines may be used for making products and forklifts may move materials or the manufactured items between specific locations in the facility 100. Employees 107 may operate or supervise the machines or forklifts, or may perform other physical tasks.

Some kinds of resources may be used in a particular type of facility. Production plants and warehouses are examples of facility types. Here, a production plant 106 can include the machine 104 and the employee 107 responsible for the machine. Similarly, a warehouse facility 108 can include the forklift 105 and the employee 107 responsible for the forklift.

There can be performed in the production plant 106 physical operations that are designed to make a specific product, such as by transforming a material that is a component of the product. Make-type operations are mainly the focus in manufacturing operations. There can also be performed operations in the production plant that are designed to move the product within the production plant or to pack the product into a container. Similarly, in the warehouse facility 108, there can be performed physical operations that are designed for post-manufacturing logistics management of products. Move-type operations are mainly the focus in warehouse facilities. There can also be performed operations in the warehouse facility that are designed to make a product, for example by assembling components.

Moreover, the physical environment 103 may represent a merging of the manufacturing world and the warehousing world. That is, the facility 100 may be configured such that there is no distinct point where manufacturing ends and warehousing begins. For example, a business approach such as "assemble to order and ship" may be practiced using the physical environment 103. Such implementations may have allow stock levels to be kept lower, provide shorter supply cycles and minimize stock shortage at stores.

The computer environment 102 can initiate physical operations to be performed by any of the resources. There may be at least one initiation module 110 designed for initiating operations in the production plant 106. For example, the initiation module 110 can automatically interface with the machine 104 and control it to perform the operation. As another example, the initiation module 110 may generate a message to the employee 107 to make a specific product using the machine 104 or to perform another physical operation.

Similarly, there may be at least one initiation module 112 designed for initiating operations in the warehouse facility 108. For example, the initiation module 112 can automatically interface with the forklift 105 and control it to move a product to a specific location. As another example, the initiation module 112 may generate a message to the employee 107 to move the product using the forklift or to pack a specific product into a container.

The computer environment 102 generates information for use in physical procedures. The generated information may be used in initiating and performing the procedure and may identify a production-type operation or a warehousing-type operation, or both. The computer environment 102 includes a request management module 114, an order management module 116, and an information collection module 118. The request management module 114 manages requests to perform one or more physical operations at a specified time. Requests may involve the production plant 106 or the warehouse facility 108, or both. For example, the request is generated upon a user entering a sales order into the system, indicating that a particular product should be shipped on a specified day. In an implementation that does not use the order management module 116, the request management module 114 may initiate performance of a procedure using the initiation modules 110 or 112.

In implementations that include the order management module 116, an order object may be generated based on the request. The order object describes the planning of the physical operations to be performed down to an execution level. For example, assume that a request is made to create product A today, and that several procedures are involved in completing the requested task. Raw material for the product A needs to be obtained and then the manufacturing operations are to be performed thereon. Several other steps may be involved before the product A ships including packing the product into a shipping box. The order management module 116 may organize all of the procedures and data involved with incoming requests and make the organization data available to other users in the computer environment 102.

Based on the order object, or directly from the request in an order-less implementation, the information collection module 118 is initiated for executing the operations. The information collection module 118 can generate an information collection object that collects actual data from the performance of one or more physical operations in the physical environment 103 and documents the progress of the operations. The information collection module 118 makes the data available for one or more purposes, such as for confirming the performed operations, updating a fulfillment status of the order object, adjusting inventory records or for determining costs.

Figure 2A:
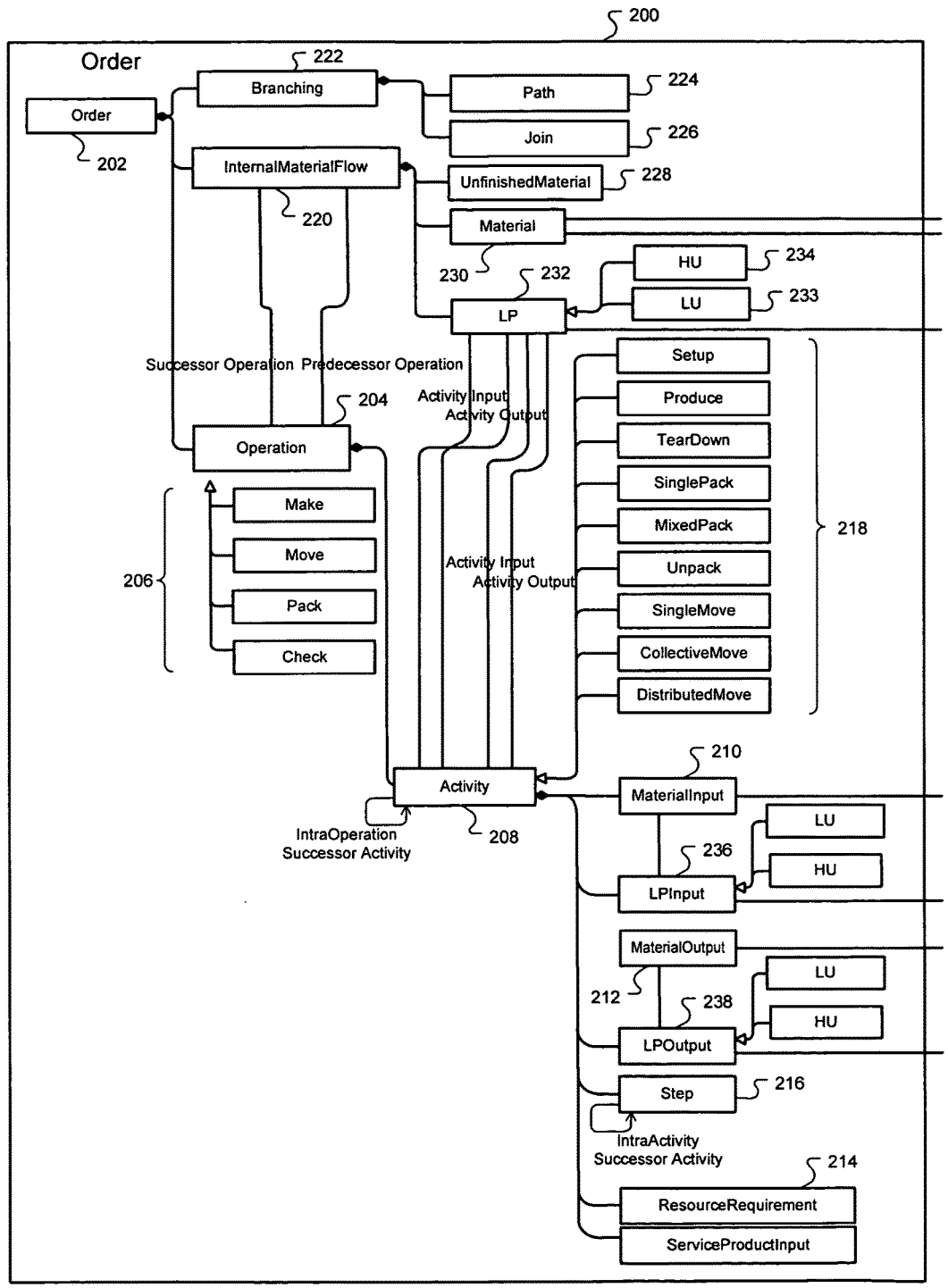
FIGS. 2A and B show a model of an order object and a lot object, respectively.
Figure 2B:
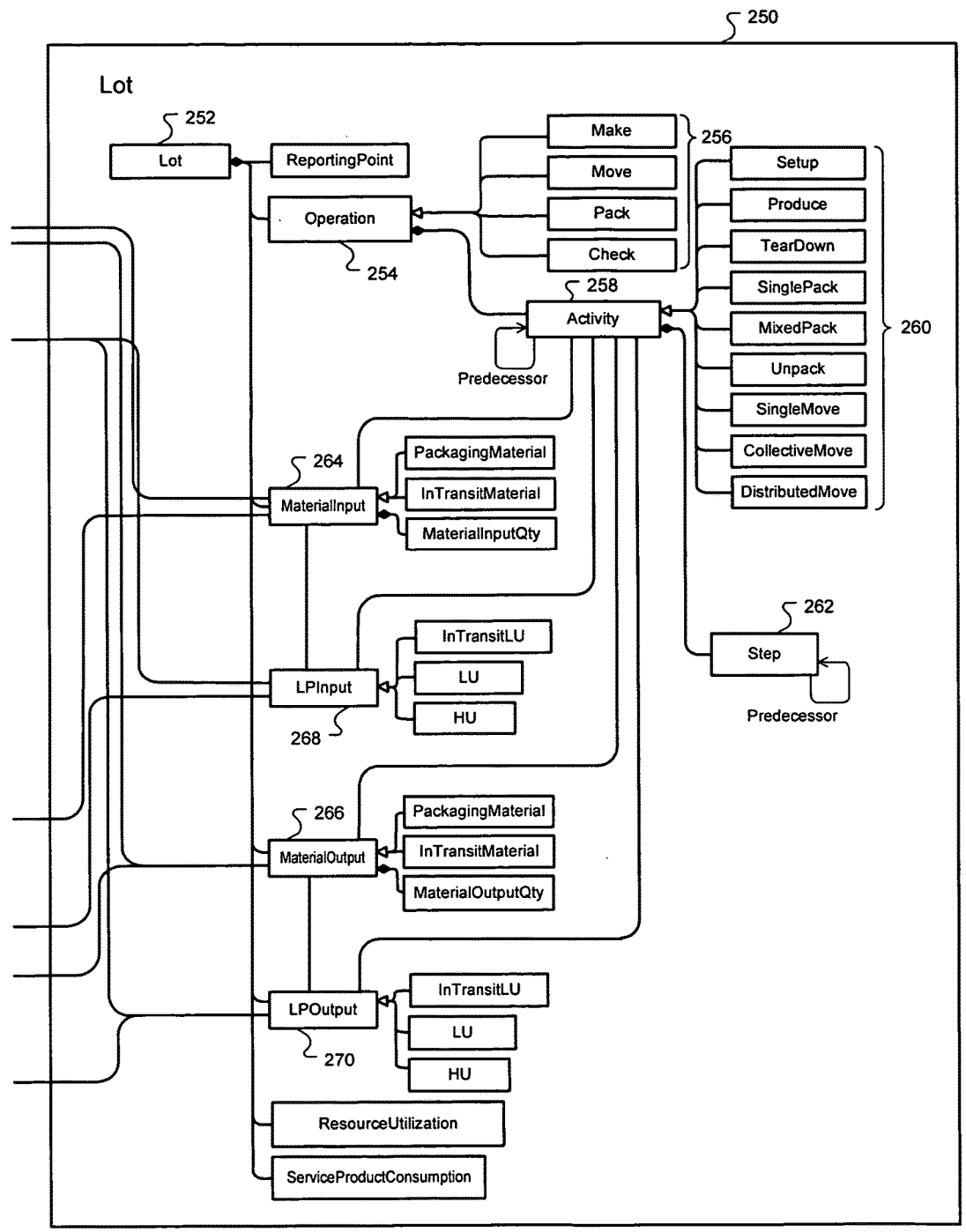

FIG. 2A shows a model of an order object 200 that is an example of what the order management module 116 can generate. FIG. 2B shows a model of a lot object 250 that is an example of an information collection object that the information collection module 118 can generate. The order 200 includes a header node 202. Associated with the header node is an operation node 204 representing one or more operations that are planned for a resource to perform according to the order. The operations may be of different types, as indicated by operation types 206 associated with the operation node 204. For example, the operation types include making, moving, packing or checking a product.

Each operation node 204 is associated with at least one activity node 208 that represents an activity that is to be performed within the operation. The activity node contains scheduling information for the execution. The activity node may be associated with at least one material input node 210 and at least one material output node 212 representing the material(s) before and after performing the activity, respectively. There can be several material inputs and several material outputs, each of which represents one material that enters, or results from, the activity. For site logistics management the material input node indicates the source location (for moving operation), logistics unit (for packing operation), or quantity or stock category (for checking operation). Similarly, the material output node indicates the resulting destination location (for moving operation), logistics unit (for packing operation), or quantity or stock category (for checking operation).

The activity node 208 also includes a resource requirement node 214 that represents the resource(s) needed for carrying out the activity. The activity node 208 may be associated with one or more step nodes 216 that represents a lower level of action undertaken in performing the activity. Activities can be of several different kinds. The activities in the order 200 can be any or all of activity types 218 that include setup activities, producing activities and moving activities, to name a few.

Each of the operation nodes 204 can have an association with a predecessor operation or a successor operation, or both. This is provided through an internal material flow node 220. That is, an operation in the order is associated with any operation that immediately precedes it, and with any operation that immediately succeeds it.

The order header 202 has a branching node 222 associated with it. This provides that the operations to be executed using the order can branch into more than one path. The branching node 222 is immediately followed by a path node 224 representing a sequence of operations that form a logistics process path within a branch. Such paths can be exclusive, meaning that they are alternative processing paths, only one of which may be processed at a time. The paths may be non-exclusive, meaning that several of them may be processed at a time. The branching 222 is also associated with a join node 226 representing a point at which the branched logistics process paths again unite. A branch path immediately precedes the join. Here, the internal material flow node can link to any two of the operation, branching or join nodes.

The internal material flow 220 has associated with it at least one of an unfinished material node 228, a material node 230 and a logistic package (LP) node 232. The unfinished material node represents an intermediate state of a product or item for which additional processing is planned. The material node 230 represents the material used in the processing. The LP node represents an item for packaged goods. For example, the LP can be the outcome of a packing operation. Physical units that are handled in the same manner in logistics operations refer to the same LP. The LP node 232 can function as a logistics unit (LU) 233 or as a handling unit (HU) 234. Generally, the HU is considered as an identified LU. The activity node 208 has the material input node 210, the material output node 212, an LP input node 236 and an LP output node 238 associated with it, representing the input and output of one or more materials and LPs in performing the activity.

The lot 250, in turn, correlates to the order in several areas. It has a lot header 252 with which is associated one or more operations 254. Particularly, the operations planned in the order will be recorded in the lot upon being executed. The operation node 254 has any of operation types 256. Similarly, the lot contains at least one activity node 258 that can be any of activity types 260. One or more step nodes 262 can be associated with each activity node.

The lot 250 includes a material input node 264 correlating to the material input node 210 of the order 200. Similarly, the lot includes a material output node 266 correlating to the material output node 212 of the order. Here, the lot also includes an LP input node 268 and an LP output node 270 correlating, respectively, to the LP input node 236 and the LP output node 238 of the order.

In execution of the physical operation(s) planned by the order 200, the lot 250 collects the actual data generated for each step of each activity in the operation, and tracks the materials and LUs that are involved in the process. An example of this will now be described.

Figure 3:
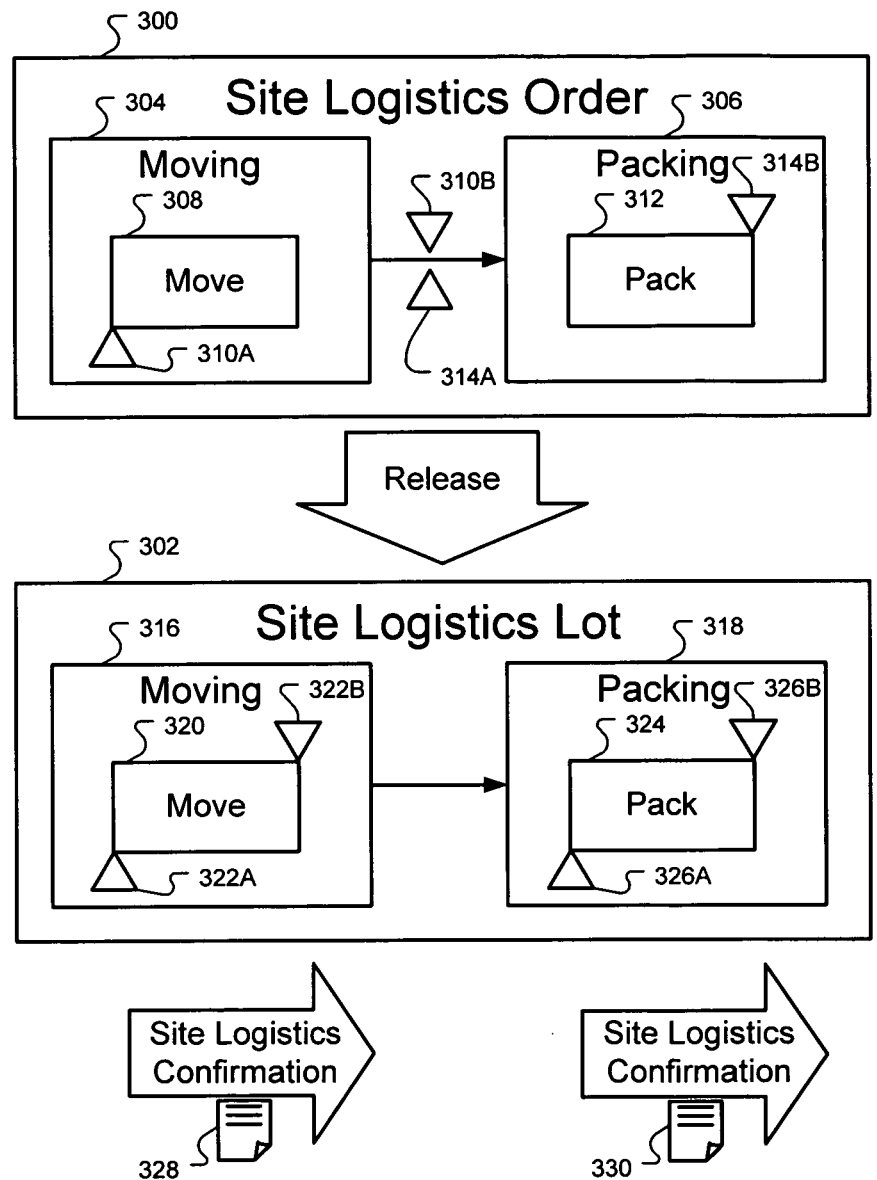
FIG. 3 schematically shows activities in an order object and a lot object.

FIG. 3 shows a site logistics order 300 and a corresponding site logistics lot 302. The order 300 has been created for performing a moving operation and a packing operation. "Site logistics" is here used in reference to operations performed at warehouse facility, in a distribution center, in a computer organized shipping yard, or any other location where logistics processes are used. The order 300 is an object that the order management module 116 can generate.

The order 300 includes a moving operation 304 and a packing operation 306. Each operation corresponds to the operation node 204 in the model. The moving operation is planned for use in moving a product or a material from one point to another, and the packing operation is planned for packing the material or product in a certain way. The operations are planned such that the moving operation will first be performed, and thereafter the packing operation. For example, the product is being moved to the packing station to be packed. Between the operations 304 and 306 in the order object there is an internal material flow node as discussed above.

The moving operation 304 includes a move activity 308 that corresponds to the execution of the moving operation. The move activity receives a material to be manipulated at a material input node 310A and completes at a material output node 310B. The move activity corresponds to the activity node 208 in the model, and the input and output correspond to the respective LP input and output nodes 236 and 238. The inputs also correspond to the material input node 210 and the material output node 212.

Similarly, the packing operation 306 includes a pack activity 312 that receives the material to be manipulated at a material input 314A. This corresponds to the material at the material output node 310B. The packing operation 306 completes at a material output node 314B. The input 314A and the output 314B correspond to the respective LP input and output nodes 236 and 238, and also correspond to the material input node 210 and the material output node 212.

Upon release of the order 300, the site logistics lot 302 will be generated. The lot 302 includes components corresponding to those of the order and will collect the actual data generated in the execution. Thus, the lot will include a moving operation 316 and a packing operation 318. The moving operation includes a move activity 320 with an input 322A and an output 322B. Similarly, the packing operation 318 includes a pack activity 324 having an input 326A and an output 326B. Each of these components represents the corresponding data collected upon execution.

The information collected in the lot 302 can be used for several purposes. There is sometimes a change in the execution of the physical operations compared to the planning in the site logistics order. For example, the packing operation 306 is scheduled to be performed once. After performing this operation, however, the packing may be found to be faulty for some reason. This requires the packing step to be performed again in the physical execution. The site logistics lot 302 records the data about the two packing steps, as well as the other data from executing the site logistics order 300. Thus, the site logistics lot 302 can later be compared against the site logistics order to determine any discrepancies between the planned execution and the actual execution. In some circumstances, the order may be changed in addition to such a change in the lot. For example, this may be done if the planning data contained in the order is required to continue the execution.

As another example of using the collected information, one or more confirmation objects can be generated to confirm the performance of the operation(s). Here, a first confirmation document 328 is generated to confirm that the moving operation has been performed, and a second confirmation document 330 is generated to confirm the packing operation.

Figure 4:
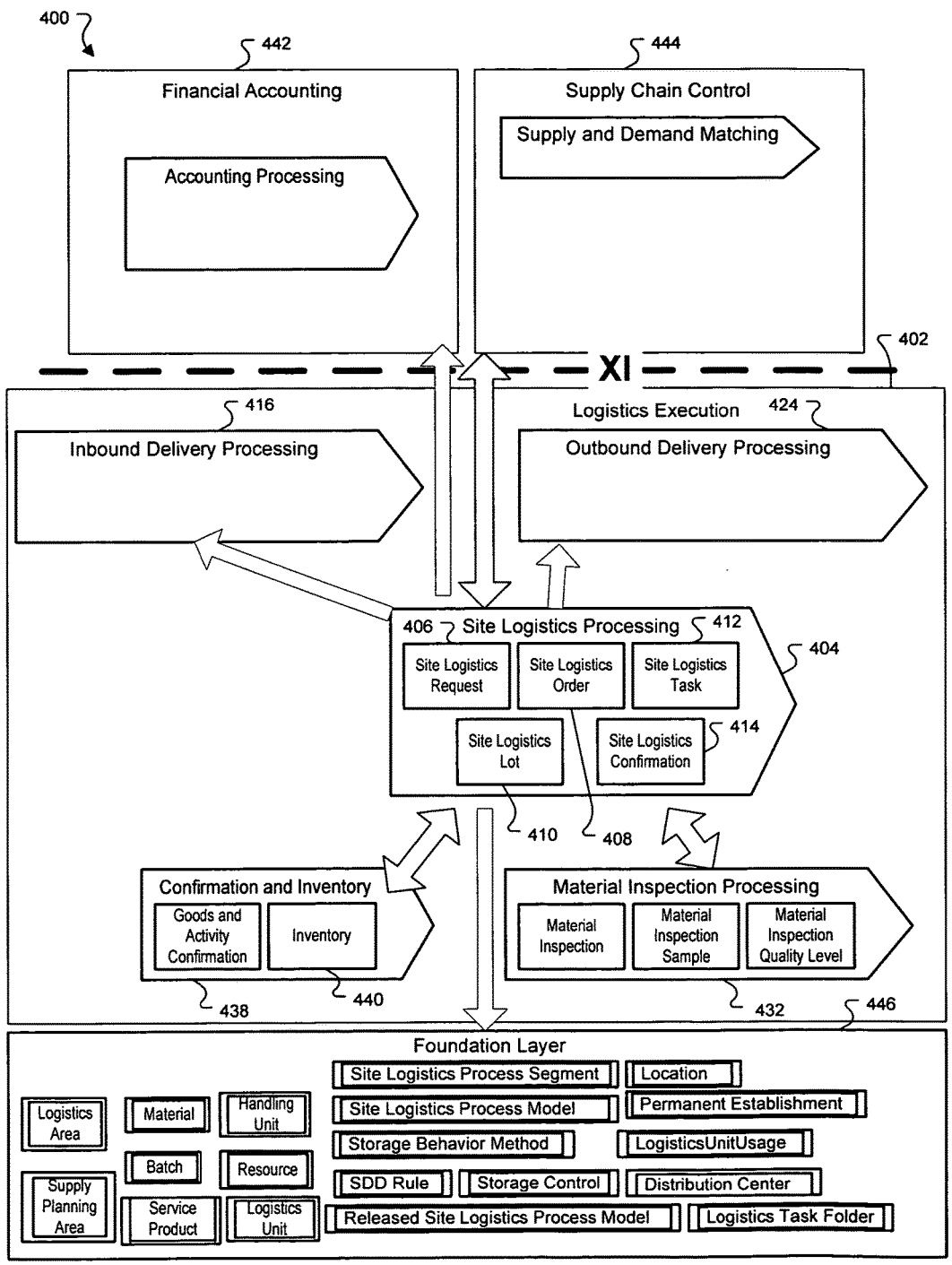
FIG. 4 schematically shows a logistics execution module that works with execution objects.

FIG. 4 shows a site logistics interaction model 400. The model illustrates how site logistics processing can interact with a variety of processing components. Included in the model is a logistics execution module 402. The logistics execution module 402 is here used in planning and executing physical operations in a post-manufacturing scenario, such as in a warehouse.

The logistics execution module 402 contains a site logistics processing component 404 that includes the information relating to the performance of physical operations. The logistics execution module 402 also can be used in executing operations in other facilities, such as in a production plant. The logistics execution module may then be provided with a production processing component having a structure similar to that of the site logistics processing module 404. That is, the corresponding production processing component is mainly focused on manufacturing products and may share a common structure with the site logistics processing component. For example, such an implementation may include an information collection object that is used analogously to the site logistics lot 302 described above. After the performance of the physical operation in the production plant, such a "production lot" object may be used in tracking a product genealogy for the manufactured product.

Here, the site logistics processing component includes five business objects: a site logistics request 406, a site logistics order 408, a site logistics lot 410, a site logistics task 412 and a site logistics confirmation 414. The site logistics order and the site logistics lot correspond to the models shown in FIGS. 2A and B. The site logistics request 406 is a request to perform logistics operations at a certain time that support outbound, inbound and site logistics processes. The site logistics request represents the internal view of execution. It may contain information about the execution and this information may be arranged in one or more segments. Creation of the site logistics request may be triggered from a logistics execution processing component in a supply chain control 444 to handle deliveries into the warehouse (inbound movement) or out from the warehouse (outbound movement). The supply chain control 444 sends a message to the site logistics processing component 404 to initiate the site logistics request and another message to the inbound or outbound delivery processing component, as the case may be. Alternatively, creation of the site logistics request to handle internal movements can be triggered by a storage control object in a foundation layer 446, for example to replenish a storage location from another storage location in the warehouse. The site logistics request provides site logistics functionalities, such as site logistics order initiation or, in order-less implementations, site logistics lot creation.

The site logistics task 412 is an object that reflects the organization of work to be performed at a site. The site logistics task divides the site logistics process into self-contained work items. The tasks are to be executed by one or more persons, or by an automation system, involved in the site logistics process. The workers receive all the instructions they need to execute a task via the user interface, and are requested to input actual data. The site logistics confirmation 414 is a document that is used to confirm any changes to physical stock quantities (for example, as a result of goods movements). It includes information about inventory changes, deviations from plan, execution timestamps, and the users and resources involved. The site logistics confirmation updates inventory, finance, and planning.

In implementations where a production processing component is used, it may contain objects that correspond in function to the respective site logistics request, the site logistics order, the site logistics lot, the site logistics task and the site logistics confirmation.

The site logistics processing component 404 interacts with several other process components as part of site logistics execution. The first of these process components is a supply chain control module 444 which constitutes a request for receiving goods from a vendor or for delivering goods to a customer based on a purchase order or a sales order. The execution of the process is managed by the site logistics processing component 404. During the execution the site logistics processing component interacts with an inbound delivery processing component 416 or an outbound delivery processing component 424, creating an inbound delivery document or an outbound delivery document with the actual relevant logistics data of execution. The inbound delivery processing component 416 enables communication with the vendor and invoicing. The outbound delivery processing component 424 enables communication with the product recipient and billing.

Another processing component that the site logistics processing component 404 interacts with is a material inspection processing component 432. The material inspection processing component 432 is responsible for planning and executing quality inspection documents. The interaction model can be divided into two main parts: the planning phase and the execution phase. In the planning phase, the material inspection processing component 432 determines the necessity for quality inspection for each of the provided products. At that point, all material inspection documents within the material inspection processing component 432 are created. In the execution phase, the site logistics lot 410 is created potentially with the corresponding site logistics task 412. The material inspection processing component 432 has its own task, and the user who performs the quality inspection test can access the UI for the material inspection processing. The actual reporting of quality inspection results will be done within the material inspection processing component 432. After finalizing the quality inspection reporting, the process control returns to the site logistics processing component 404. Stock quality decisions that are made within the material inspection processing component 432 will serve as a basis for stock category updates (if required). Stock category updates will be carried out by the site logistics processing component 404. The material inspection processing component 432 contains respective objects for material inspection, material inspection sample and for material inspection quality level.

Another processing component that the site logistics processing component 404 interacts with is a foundation layer 446. The foundation layer includes, among other components, the following business objects: storage behavior method, source and destination determination (SDD) rule and storage control. These business objects are responsible for planning internal operations (e.g. replenishment). They determine whether replenishment is needed, what is the quantity, from which bin to take the stock etc. SDD is a process that searches for the best location for stock retrieval or for stock placement (for example which logistics area). The initial part of the process determines the most appropriate SDD rule according to which a suitable location is found. The rule defines a sequence of locations to search by. After finding the location, the rule identifies the storage behavior method of the location (i.e., a rule node in the storage behavior method business object), which specifies the strategy for retrieval or placement of stock and the constraints that need to be satisfied. Availability of inventory is checked and the answer is provided to the client. Turning now to the storage control business object, it can create the site logistics request 406 to execute an internal process.

The site logistics processing component 404 also interacts with a confirmation and inventory processing component 438. Particularly, the site logistics processing component 404 deals with the execution of processes within the site (e.g., moving, packing, counting etc.), and these stock changes must be updated in the inventory. The site logistics processing component 404 interacts with an inventory object 440 in the confirmation and inventory processing component 438.

The site logistics processing component 404 interacts with a financial accounting module 442, for example to perform accounting processing. The logistics execution module 402 also interacts with the supply chain control module 444 to match supply and demand, to respond to inbound and outbound deliveries, and in managing the fulfillment and inventory changes in site logistics processing. These interactions may take place using an integration technology such as the Exchange Infrastructure (XI) available in products from SAP AG in Walldorf (Baden) Germany. The site logistics processing component 404 also interacts with the foundation layer 446 that may provide a released site logistics process model, definitions for logistics and supply planning areas, materials and batches, service products and handling units, resources and logistics units. The foundation layer 446 may also provide a Site Logistics Process Segment, a Site Logistics Process Model, a Storage Behavior Method, a Location, a Permanent Establishment, a LogisticsUnitUsage, a Distribution Center, and a Logistics Task Folder.

The above is an example of how the site logistics processing component 404 functions within the logistics execution module 402 and the various interactions it can have. A production processing component can be included in the logistics execution module 402 and can have similar functions and interactions.

Figure 5:
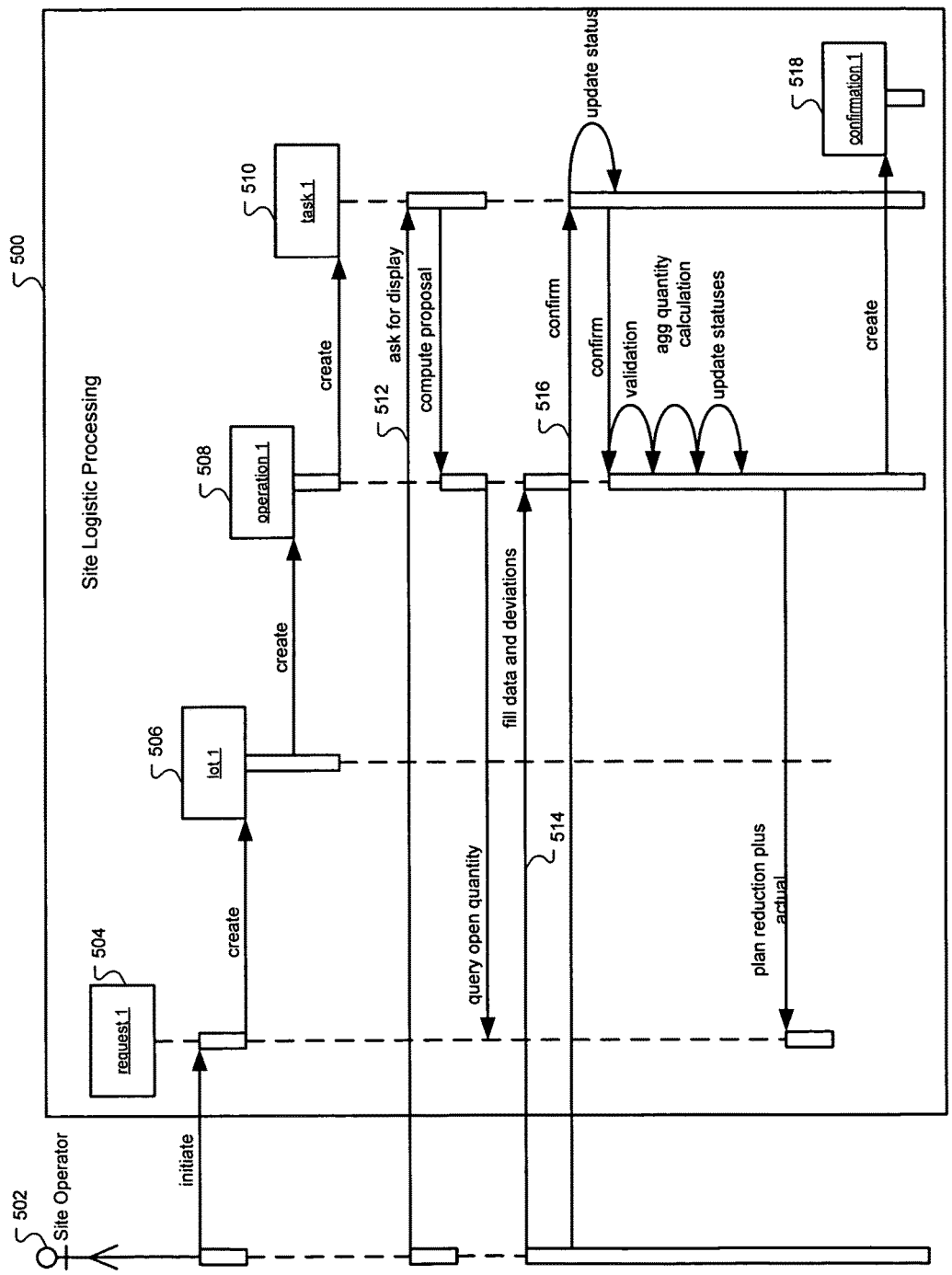
FIG. 5 is a sequence diagram representing an order-less site logistics processing.
Figure 6:
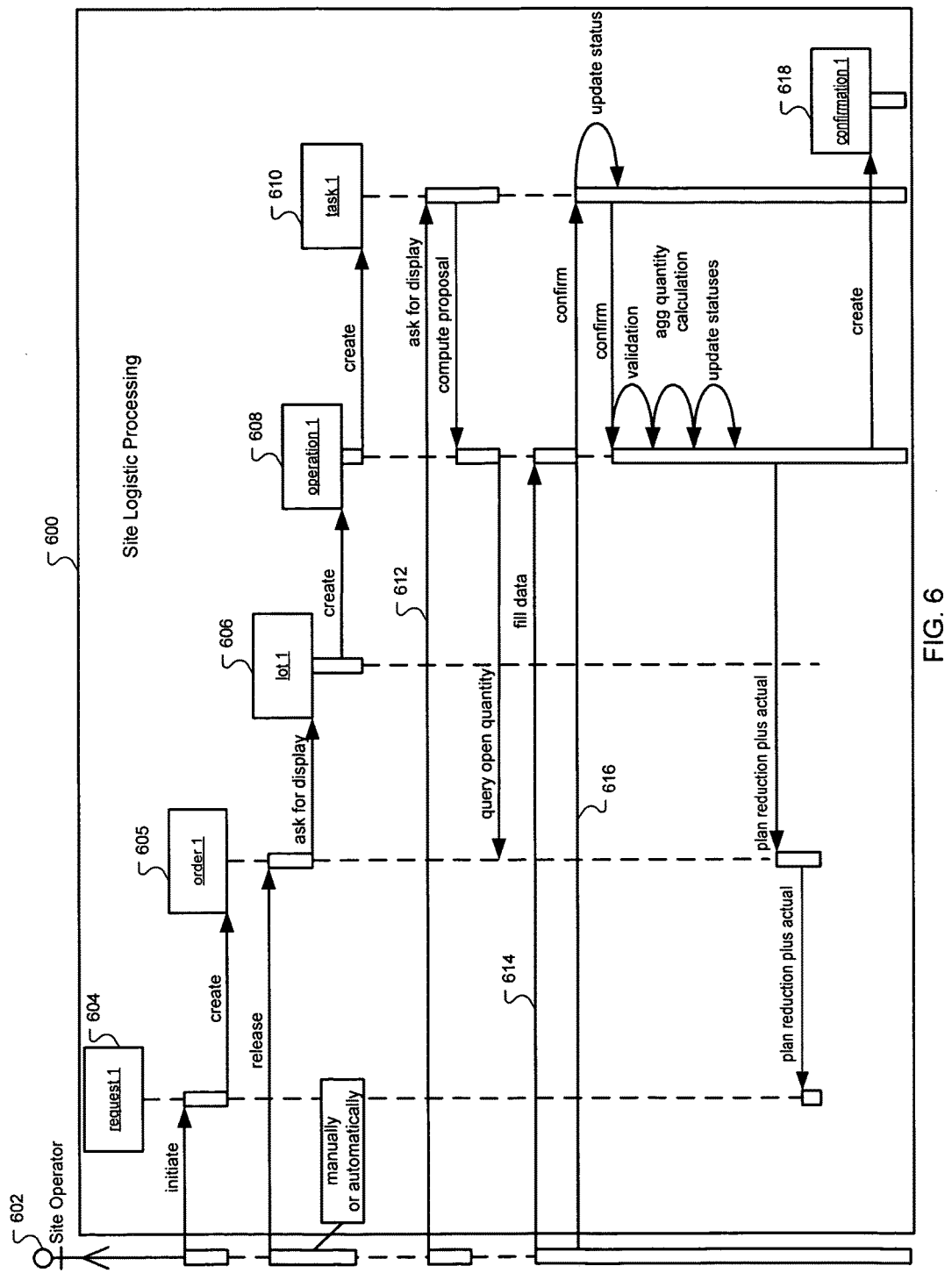
FIG. 6 is a sequence diagram representing an order based site logistics processing.

FIG. 5 shows an exemplary sequence diagram of a site logistics processing 500 for performing a physical operation. The processing 500 does not use an order object. In contrast, FIG. 6 shows an exemplary sequence diagram of a site logistics processing 600 in which an order object is used. Either or both of the processings 500 and 600 can be performed in a computer system, such as in the computer environment 102. Particularly, the request management module 114, the information collection module 118 and either or both of the initiation modules 110 and 112 may be used in the processings. In the processing 600, also the order management module 116 may be used.

The processing 500 begins upon a site operator 502, such as an employee, initiating a request 504. This may be a request to initiate one or more particular operations, such as a move-type operation or make-type operation. For example, this may involve the site logistics request object 406. The request 504 creates a lot 506 in response to the initiation. The lot 506 is responsible for collecting the actual data generated in performing the operation(s). For example, this may be the site logistics lot object 410 and it may be based on the lot model 250. The lot 506, in turn, creates at least one operation 508 in response to being created. The operation(s) 508 may correspond to the operation node 204 and may be of any of the operation types 206. The operation 508 creates at least one task 510 upon being created. The task(s) 510 may correspond to the site logistics task object 412.

Next, the operator 502 may initiate the task 510 through an "ask for display" input 512. The task 510 triggers the proposed values to be computed in the operation 508. The operation 508, in turn, uses an open quantity obtained from the request 504 and information about a quantity available in inventory to compute the proposal.

In an input 514, the user accepts or overwrites the default values for confirmation. Then, the user presses "confirm" or "save" in a UI for the task 510, corresponding to making an input 516, which triggers the confirmation. The lot 506 updates the task 510 to change its status and triggers the confirmation of entered data in the operation 508. The operation 508 then validates the actual data, calculates aggregated quantities, and updates its own statuses. The operation 508 then passes the plan reduction and the actual data to the request 504. The operation also creates a confirmation 518 with the appropriate line items such as inventory changes. The confirmation 518 may be the site logistics confirmation 414, for example. The confirmation 518 updates the inventory and notifies the financial accounting module 442 and the supply chain control module 444.

Turning now to the processing 600, it begins upon a site operator 602 initiating a request 604. This triggers an order 605 to be created. For example, the order 605 may be the site logistics order 408 and it may be based on the model 200. Upon the operator releasing the order 605, a lot 606 is created. The creation of the lot 606 triggers creation of at least one operation 608. The operation 608 in turn creates at least one task 610 upon being created. Next, the operator 602 initiates the task 610 through an "ask for display" input 612. The task 610 triggers the proposed values to be computed in the operation 608. The operation 608, in turn, uses an open quantity obtained from the order 603 and information about a quantity available in inventory to compute the proposal.

In an input 614, the user accepts or overwrites the default values for confirmation. Then, the user presses "confirm" or "save" in a UI for the task 610, corresponding to making an input 616. The lot 606 updates the task 610 to change its status and triggers the confirmation of entered data in the operation 608. The operation 608 then validates the actual data, calculates aggregated quantities, and updates its own statuses. The operation 608 then passes the plan reduction and the actual data to the order 605. The order again passes the data to the request 604. The operation 608 also creates a confirmation 618 with the appropriate line items such as inventory changes. The confirmation 618 updates the inventory and notifies the financial accounting module 442 and the supply chain control module 444.

Figure 7:
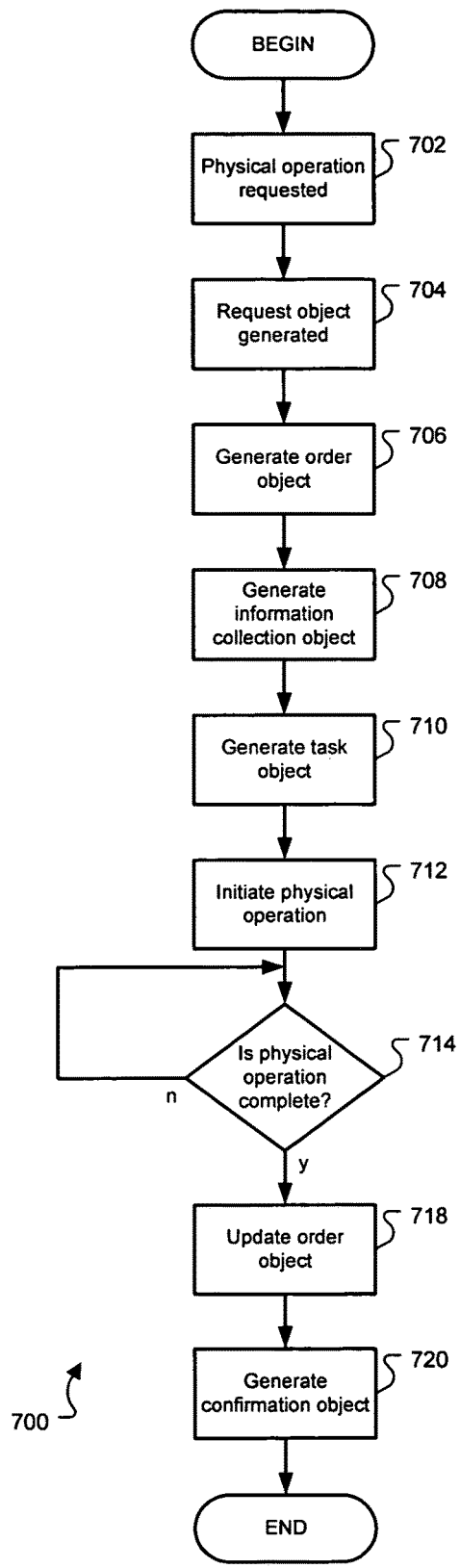
FIG. 7 is a flow chart of an exemplary method.

FIG. 7 is a flow chart of exemplary operations 700 that can be performed in connection with the performance of a physical operation. The operations 700 can be performed by a processor executing instructions stored in a computer program product, for example any of the modules shown in the computer environment 102. The operations 700 begin with a physical operation being requested in step 702. This may be an input by the site operator 602.

In step 704, a request object is generated for the request. Thus, there can be received a request object corresponding to a request to initiate a physical operation.

In step 706, there may be generated an order object that describes the physical operation. For example, the order object may be based on the model 200. In order-less implementations, the step 706 may be omitted.

In step 708, an information collection object is generated. The object is configured to represent performance of the physical operation. The information collection object may be based on the model 250. For example, the information collection object may contain one or more operation nodes. The information collection object may be generated upon release of the order object or directly upon the request object being generated.

In step 710 there is generated a task object that corresponds to a predefined physical task that is part of the physical operation. For example, the task object may be the site logistics task object 412.

In step 712, the physical operation is initiated. This may be done using the information collection object. The physical operation may be initiated using either or both of the initiation modules 110 and 112. In step 714, it is determined whether the physical operation is complete. If not, the operations 700 may continue monitoring the physical operation.

If the physical operation is determined to be complete in step 714, the order object is updated in step 718. In order-less implementations, step 718 may be omitted.

In step 720, a confirmation object is created. For example, this is the site logistics confirmation 414.

Figure 8:
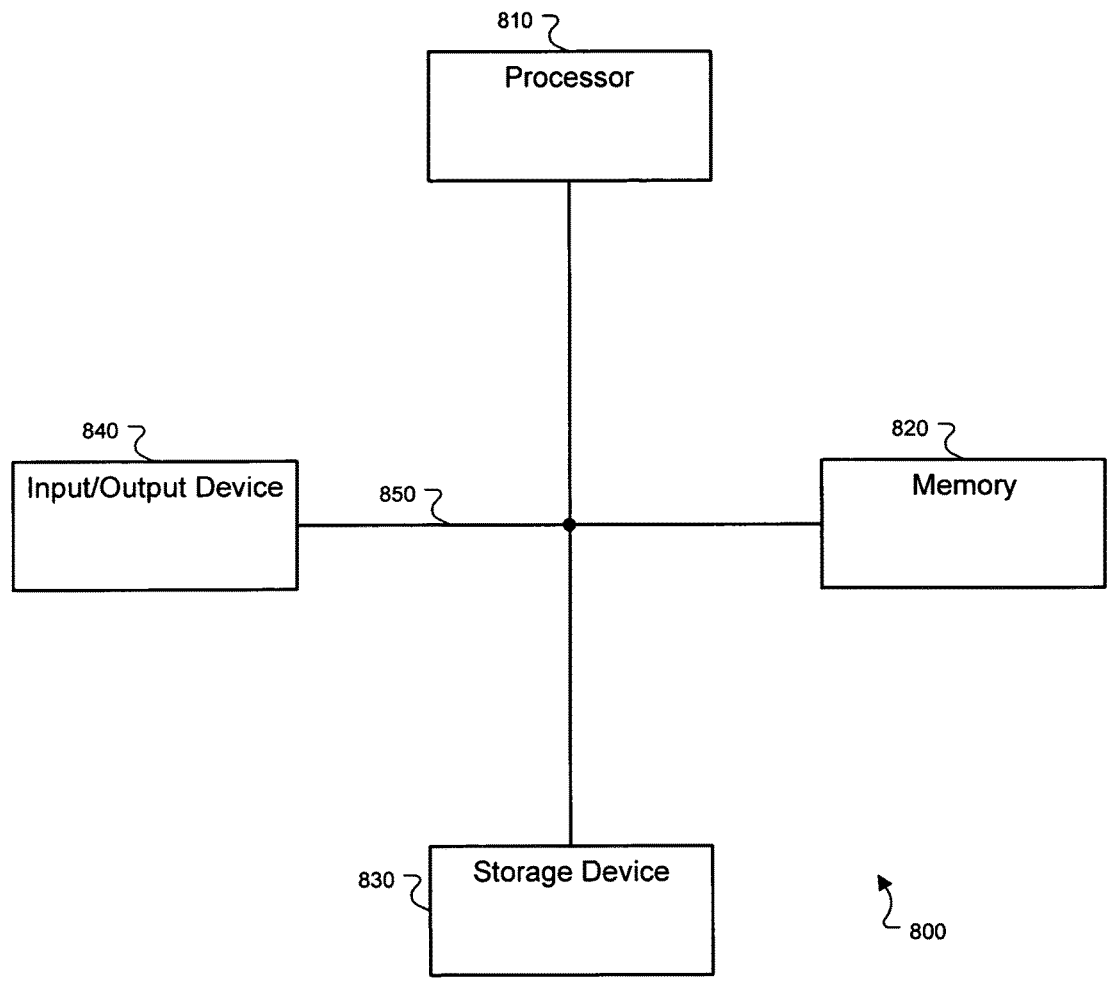
FIG. 8 is a block diagram of a computer system.

FIG. 8 is a block diagram of a computer system 800 that can be used in the operations described above, according to one embodiment. For example, the system 800 may be included in the computer environment 102.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one embodiment, the processor 810 is a single-threaded processor. In another embodiment, the processor 810 is a multi-threaded processor. The processor 810 is capable of processing instructions stored in the memory 820 or on the storage device 830 to display graphical information for a user interface on the input/output device 840.

The memory 820 stores information within the system 800. In one embodiment, the memory 820 is a computer-readable medium. In one embodiment, the memory 820 is a volatile memory unit. In another embodiment, the memory 820 is a non-volatile memory unit.

The storage device 830 is capable of providing mass storage for the system 800. In one embodiment, the storage device 830 is a computer-readable medium. In various different embodiments, the storage device 830 may be a floppy disk device, a hard disk device, an optical disk device, or a tape device.

The input/output device 840 provides input/output operations for the system 800. In one embodiment, the input/output device 840 includes a keyboard and/or pointing device. In one embodiment, the input/output device 840 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method to be performed in a computer system in association with initiating a physical operation, the method comprising:
   receiving, in a computer system, a request for the computer system to initiate performance of a physical operation;
   generating, by the computer system in response to receiving the request, an order object that describes multiple activities of a planned performance of the physical operation, wherein the physical operation comprises physically manufacturing a physical product in a product manufacturing process;
   generating, by the computer system in response to receiving the request, an information collection object that is configured to:
     (i) exist in the computer system at least during actual performance of the physical operation, and
     (ii) record actual data that is generated in the computer system during the actual performance of the physical operation and that describes multiple activities of the actual performance of the physical operation for manufacturing the product, wherein the actual data documents progress of the actual performance of the physical operation;
   initiating the actual performance of the physical operation based on the description in the order object of the multiple activities of the planned performance of the physical operation;
   obtaining, by the computer system, the actual data that is generated during the actual performance of the physical operation and that describes the multiple activities of the actual performance of the physical operation;
   recording, by the computer system, the actual data in the information collection object, wherein during the actual performance of the physical operation a change in the multiple activities of the physical operation for manufacturing the product is made relative to the description by the order object of the multiple activities of the planned performance of the physical operation for manufacturing the product;
   recording, by the computer system, the change in the multiple activities of the physical operation in the information collection object and not in the order object; and
   comparing, by the computer system, the information collection object to the order object to determine the change between the multiple activities of the planned performance of the physical operation for manufacturing the product and the multiple activities of the actual performance of the physical operation for manufacturing the product.

* * * * *